US008140362B2

(12) United States Patent
Deshpande et al.

(10) Patent No.: US 8,140,362 B2
(45) Date of Patent: Mar. 20, 2012

(54) AUTOMATICALLY PROCESSING DYNAMIC BUSINESS RULES IN A CONTENT MANAGEMENT SYSTEM

(75) Inventors: Prasad Manikarao Deshpande, San Jose, CA (US); Savitha Srinivasan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1671 days.

(21) Appl. No.: 11/216,578

(22) Filed: Aug. 30, 2005

(65) Prior Publication Data

US 2007/0094199 A1 Apr. 26, 2007

(51) Int. Cl.
*G06N 5/02* (2006.01)

(52) U.S. Cl. ...................................................... 705/7.11

(58) Field of Classification Search .................. 705/1, 7, 705/7.11; 707/200; 709/218
See application file for complete search history.

(56) References Cited

U.S. PATENT DOCUMENTS

| | | | | |
|---|---|---|---|---|
| 2003/0014500 | A1* | 1/2003 | Schleiss et al. | 709/218 |
| 2003/0142128 | A1* | 7/2003 | Reulein et al. | 345/742 |
| 2003/0144982 | A1* | 7/2003 | Reulein et al. | 707/1 |
| 2003/0195762 | A1* | 10/2003 | Gleason et al. | 705/1 |
| 2004/0064351 | A1* | 4/2004 | Mikurak | 705/7 |
| 2004/0107125 | A1* | 6/2004 | Guheen et al. | 705/7 |
| 2005/0171980 | A1* | 8/2005 | Fernandez et al. | 707/200 |

OTHER PUBLICATIONS

Dynamic Business Process Formation by Integrating Simulated and Physical Agent Systems, by Fu-ren Lin, Shyh-ming Lin and Po-win Hsueh. Proceedings of the 37th Hawaii International Conference on System Sciences—2004.*

"Business Semantics of Business Rules Request for Proposal," Object Management Group, Business Semantics of Business Rules, RFP Jul. 22, 2003.

Marko Bajec, et al., "Managing Business Rules in Enterprises," Elektrotehni skivestnik 68(4):236-241, 2001 Electrotechnical Review, Ljubljana, Slovenija.

Methodologiesh. Herbst, et al., "The Specification of Business Rules:A Comparison of Selected," Paper presented at the IFIP Working Group 8.1 Conference CRIS 94, University of Limburg, Maastricht.Published in: A.A. Verijn-Stuart, T.-W. Olle (Eds.), Methods and Associated Tools for the InformationSystem Life Cycle, Amsterdam et al.: Elsevier 1994, pp. 29-46.

Eric. N. Hanson, "The Design and Implementation of the Ariel Active Database Rule System," Sep. 1991, with a shorter version having appeared in the Proceedings of the ACM SIGMOD Conference, Jun. 2002.

Jennifer Widom, "The Starburst Active Database Rule System," Knowledge and Data Engineering 1996.

* cited by examiner

*Primary Examiner* — Beth V Boswell
*Assistant Examiner* — Ernest A Jackson
(74) *Attorney, Agent, or Firm* — Shimokaji & Assoc., P.C.

(57) ABSTRACT

A business rule processing system automatically processes dynamic business rules in a content management system, allowing frequent updates to the business rules. The updates can be automatically adapted by the system without restarting the content management system. The system utilizes a stand-alone rule engine. Business logic is encoded as business rule definition files using a platform-independent language; the business rule definition files are stored in a central business rule repository. The business rules are managed and executed by the rules engine; the rules engine provides business rule processing services to other parts of the content management system. The system reduces development and maintenance cost, accelerates the business rule update cycle, and simplifies administration efforts.

18 Claims, 8 Drawing Sheets

AUTOMATICALLY PROCESSING DYNAMIC BUSINESS RULES IN A CONTENT MANAGEMENT SYSTEM

CROSS-REFERENCE TO RELATED APPLICATIONS

The present application is related to co-pending U.S. patent application titled "System, Method, and Service for Automatically and Dynamically Composing Document Management Applications", Ser. No. 10/980,716, which was filed on Nov. 3, 2004, and to co-pending U.S. patent application titled "System and Method for Defining and Generating Document Management Applications for Model-Driven Document Management", Ser. No. 11/123,735, which was filed on May 5, 2005, both of which are assigned to the same assignee as the present application, and are incorporated herein by reference.

FIELD OF THE INVENTION

The present invention generally relates to content management. More specifically, the present system pertains to a business rule engine in a content management application that applies dynamic, selectable business rules to data items; the business rules manage processing of the data items and execute actions based on information in the data items.

BACKGROUND OF THE INVENTION

Content management (CM) is defined as software that builds, organizes, manages, and stores collections of digital works in any medium or format. Content management refers to the process of handling various types of structured and unstructured information, including images and documents that may contain billing data, customer service information, or other types of content. Content management further refers to the process of capturing, storing, sorting, codifying, integrating, updating and protecting any and all information. Studies estimate that more than 75% of enterprise data is unstructured and document-related.

Key technologies in the content management market comprise traditional document management, Web content management, digital asset management, and records management. Users of content management are in document-heavy industries, where document management is often essential for regulatory or compliance reasons. A real-time enterprise needs content management so it can create, access, and transfer information, as needed, to meet business goals of the enterprise.

Current content comprises many different forms of unstructured data that requires management:

- Dynamic Web content—business data in relational databases and personalized information;
- Business documents—ranging from contracts and invoices to forms and e-mail that facilitate internal back-office processes and enable direct external communication with customers, partners, and suppliers;
- Rich media—such as digital audio and video that is rapidly transforming areas of training, education, marketing, and customer relationship management in many industries;
- Records Management—driven by government and industry regulations to effectively document processes, audit trails, and data retention; and
- Team Collaboration Content—Web collaboration sessions or threads, webcast content, and instant messages that are rapidly becoming an important information asset.

While outwardly dissimilar, these forms of enterprise content have similar management needs. To be truly useful, a content management solution is required to address requirements for mass storage, search and access, personalization, integration with business applications, access and version control, and rapid delivery over the Internet. From a data point of view, the difference from conventional relational databases is the support for unstructured content.

Business rule processing is a vital aspect of content management and enterprise information systems. A business rule is a statement that defines or constraints some aspect of a business. The business rule asserts business structure; the business rule further controls or influences the behavior of the business. These constraints are present in many business applications such as negotiations, including procurements and auction configuration, financial applications, catalogs and storefronts, as well as security authorization and trust management. Specific examples of business rules are:

- Free shipping for orders >$20;
- If state is Ohio, optional credit insurance form is required;
- Names of signers on a contract are required to match approved names in a customer database;
- Certain fields are required such as gross annual revenue, signature, etc.; and
- Security contract cannot exceed approved credit limit.

Conventional business rules applications comprise a standard vocabulary for knitting together business organizations and constraining various business behaviors. One conventional technology utilizes business rule classification methodologies and specification languages to model business rules. Another conventional technology comprises a conceptual model that covers business rule terminology, semantic definitions, business rule classification methodologies, and information system integration. Yet another conventional approach identifies the quick change in business rule specifications as an issue and suggests a robust and flexible business rule management scenario for enterprises to solve the problem. A further conventional application proposes a metamodel for business rule specification, a metamodel for business rule vocabulary, an XML representation for business rules, and vocabularies based on XML.

Conventional active databases are closely related to business rule processing in information systems. Traditional databases, also called passive databases, perform CRUD (create, retrieve, update and delete) operations at the request of users or client applications. Active databases enhance passive database capabilities by adding triggers and assertions that automatically perform operations based on predefined business rules. Those business rules usually have the recurring pattern of Event-Condition-Action (ECA): event determines when the business rules need to be evaluated; condition defines what is to be evaluated; and action specifies what to do when the condition is satisfied. Some conventional systems support business rule processing in the form of triggers and procedures.

Although this technology has proven to be useful, it would be desirable to present additional improvements. Directly applying those active database systems to business rule processing encounters limitations: events, conditions, and actions are mostly limited to database operations; business rules have poor portability due to lack of standards in trigger syntax, semantics, and execution behavior; there are limitations on number of triggers per table; trigger scheduling and interaction capabilities are limited; and integration with external applications is unsatisfactory.

Expert systems are related to business rule processing. An expert system is an information system that can solve problems in a domain by using information and analytical techniques developed by domain experts. Domain knowledge is usually encoded in business rules and an inference engine makes decisions based on these business rules and other available facts. Expert system business rules are in the form of Condition-Action (CA): the inference engine matches the business rule conditions with the facts in the working memory, and then executes actions in the matching business rules. One expert system uses a forward chaining inference engine and programs search working memory to find matching business rules for execution.

Although business rule processing for conventional technology has proven to be useful, it would be desirable to present additional improvements. Business rules are not static; business rules change frequently due to the changes in user requirements, company policies, government regulations, economic trends, etc. In conventional systems, business rule logic is embedded into the application logic. In conventional systems, business rule processing capabilities are widely dispersed and deeply embedded in many parts of the content management system such as in the client application, in the middle tier, and in the backend repository. Consequently, it is difficult to identify and change the business rule logic as required by dynamic business scenarios. Developers are required to know implementation details about where to make changes without affecting existing code.

Some conventional business rule applications comprise commercial off-the-shelf products that are developed by different parties. In this case, the change process is more difficult since interface standardization and compatibility problems may arise. When the upgrade to the business rule processing is completed, comprehensive testing and trial processing is required. The upgrade to the business rule processing can be disruptive because the existing content management system is typically brought offline before the upgraded system is operational.

In most existing architecture designs, the business logic and constraints are not abstracted out as business rules. Rather, the business logic and constraints are spread across various parts of system: in the client application, in the middle tier, and in the backend repository. These designs reveal many problems: the architecture is not resilient to frequent business logic changes; system development and maintenance cost is high because business rule processing implementation is tightly coupled; and there is no central fine-grained managerial control over the business rule execution, monitoring, and logging.

What is therefore needed is a system, a computer program product, and an associated method for automatically processing dynamic business rules in a content management system. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for automatically processing dynamic business rules in a content management system. The present system operates separately from the content management system, allowing frequent updates to the business rules that can be automatically adapted by the business rule processing system. While the present system is described in terms of a content management system, it should be clear that the present system is applicable as well to any repository such as, for example, file systems, relational databases, object oriented database, XML databases, etc.

The present system utilizes a stand-alone business rule engine. Business logic is encoded as business rule definition files using a platform-independent language; business rule definition files are stored in a central business rule repository. The business rules are managed and executed by a business rule engine that provides business rule processing services to other parts of a content management system. The present system reduces development and maintenance cost, accelerates the business rule update cycle, and simplifies administration efforts.

The present system comprises a centralized business rule processing system that comprises a separate layer dedicated for business rule processing. Business rules in the present system are externalized from the application code of the content management system and are executed in a stand-alone business rule engine. The present system comprises an architecture that is loosely coupled to the content management application; the present system further comprises a well-defined interface between different parts of the content management system. The present system simplifies development of business rules and provides portability and reusability of business rules. When the specifications for the business rules change, only the business rules are updated. Business rules can be independently authored and deployed into the runtime environment of the content management system without restarting transactional runtime systems, thus enabling dynamic upgrades of the business rule processing system that are automatically incorporated into operation of the business rule processing system.

Business rules are encoded as text files using a business rule definition language that is independent of programming languages or computing platforms. A business rule repository stores the business rule definition files and provides query and management facilities. The business rule engine executes the business rules in a certain order according to a specified inference engine type (forward chaining, backward chaining, etc.) and provides corresponding services to other parts of the content management system. The business rule engine is typically invoked by specific events in the system such as, for example, arrival of new data for validation. The business rule engine queries the business rule repository, locates matching business rules and related resources, and executes the located business rules.

Business rulesets are partitioned according to the data types and action types so that the relevant business rules can be located efficiently. Conditions in the business rule definition are checked and actions executed based on the results of condition evaluation. Examples of actions comprise passing messages to client applications, data operations on the repository, routing data for further processing in a workflow, etc. The repository is the persistent storage of data, metadata, and content, similar to repositories of traditional information systems.

Business rules are executed on a server side rather than a client side. Consequently, the same validation module does not need to be implemented for individual client applications on different platforms, avoiding potential incompatibility problems. Execution of the present system is transparent to client applications; only data and event messages are exchanged between clients and the server. No changes need to be made in individual clients when business rules are modified. A user can update business rules on the server side; the updated rules are applied to the next data item that matches the modified business rules. Furthermore, the present system enables fine grain control such as access control based on client types, user profiles, etc.

Typically for any action, the present system executes one or more business rules in the form of business rulesets either before taking an action, during an action, or after an action. The present system classifies business rulesets into different types according to the data processing stages: ENTRY stage, ACTION stage, and POST stage. When input data initially enters the business rule engine, ENTRY business rulesets are applied to the input data. After the ENTRY business rulesets are evaluated, the present system executes ACTION business rulesets in the ACTION stage. The ACTION business rulesets modify the content management repository. After the state of the content management repository is modified by the ACTION business rulesets, the present system triggers other possible actions based on the modified state of the content management repository 25. These business rulesets are categorized as POST business rulesets and this business rule processing stage is the POST stage.

In conventional systems, ACTION and POST business rulesets are usually not possible to implement in client applications for design, security, and performance considerations. Client applications typically require direct access to the content management repository and other parts of the content management system in a middle tier for ACTION and POST business rulesets to be coded into the client layer. This design of deep coupling is not flexible for frequent changes either at the client side or the server side. Implementing ACTION and POST business rules in conventional systems further imposes potential security threats because a bug in the client application can open the door to malicious attackers to the overall content management system. Frequent data and command flow back and forward can affect the system performance as well. In comparison, the present system can incorporate ACTION and POST business rulesets in a business rule engine without exhibiting the above-mentioned behaviors.

The present system decouples business logic from other parts of the content management system. Business logic is not dependent on the mechanisms for obtaining data or executing actions. The architecture of the present system provides standard interfaces between a data/event layer, the business rule processing layer, and a repository layer. Business logic is managed in a centralized way. Business logic is encoded into small pieces called business rules. The present system precisely controls execution of business rules, execution timing, and execution sequence.

Changes to the business logic are simply translated as creating, updating or deleting the matching business rules. Conflicts and anomalies are quickly and easily resolved and fixed. Furthermore, the total cost of ownership of a content management system utilizing the present system is lower than that of conventional systems because maintenance and development is significantly reduced, the business rule update cycle is accelerated, and the administration process is simplified. The present system allows implementation of additional facilities such as, for example, logging, auditing, and testing.

A useful application of the present system is in enforcing regulatory compliance. For example, the present system can comprise business rules that control when an item can be deleted or updated by the content management system. Adapting to changing regulations is made easier due to the separation of the business rules from the application logic of the content management system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Business Rule: A statement defining or constraining some aspect of a business. The business rule is intended to assert business structure or to control or influence the behavior of the business.

HTML (Hypertext Markup Language): A standard language for attaching presentation and linking attributes to informational content within documents.

XML: extensible Markup Language. A standard format used to describe semi-structured documents and data.

Figure 1:
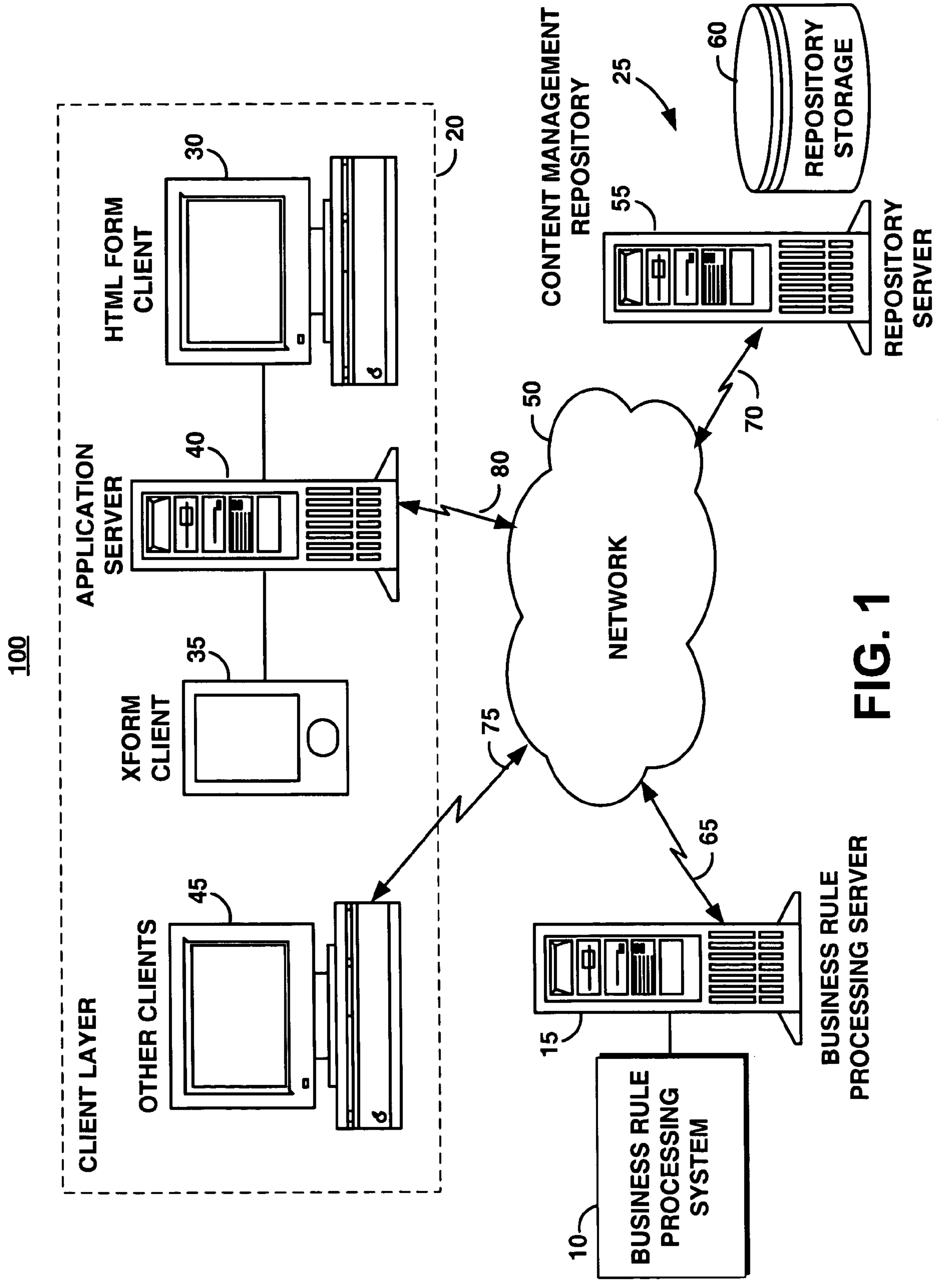
FIG. 1 is a schematic illustration of an exemplary operating environment in which a business rule processing system of the present invention can be used.

FIG. 1 portrays an exemplary overall environment (a content management system 100) in which a system, a computer program product, and an associated method (the business rule processing system or the "system 10") for automatically processing dynamic business rules in a content management system according to the present invention may be used. System 10 comprises a software programming code or a computer program product that is typically embedded within, or installed on a business rule processing server 15. Alternatively, system 10 can be saved on a suitable storage medium such as a diskette, a CD, a hard drive, or like devices.

While system 10 is referenced in terms of a data item generated by a user through interaction with a user interface, system 10 can be used to process one or more business rules associated with any data type or form that can be electronically transmitted, processed, and stored, such as, for example, paper or electronic documents, photographs, video recordings, audio recordings, etc. Furthermore, while the system 10 is described in terms of a content management system, it should be clear that the present system is applicable as well to any repository such as, for example, file systems, relational databases, object oriented database, XML databases, etc. Moreover, while system 10 is described in terms of Java, it should be clear that the present system is applicable as well to any object-oriented programming language that is platform independent.

Building blocks of a data model of the content management system 100 are item types and attributes. In database terminology, an item type corresponds to a table or relation and an attribute corresponds to a table attribute. However, unlike a flat relational table, an item type can have a hierarchical tree-like structure much like an object in object-oriented languages. Attributes for an item type can be structured with parent and child relationships that match the hierarchical structure found in real-world customer application environments. This feature is used to modeling repeating groups in which multiple instances or values of attributes may be present.

For example, a customer insurance policy can have multiple operators and multiple vehicles to be insured. The root node is called the root component and the inner nodes are called child components. Item types also capture information regarding versioning policy and retention period for the items. Application data comprises instances of these item types, called "items".

The content management system 100 comprises a client layer 20, the business rule processing server 15, and a content management repository 25. The client layer 20 comprises various types of client applications that allow a user to enter information in forms; the entered data is referenced as input data or data items. Exemplary client applications comprise an HTML form client 30 and an XForm client 35. The HTML form client 30 and the XForm client 35 submit information to system 10 and the content management repository 25 through an application server 40. The HTML form client 30 and the XForm client 35 represent web-based clients. Other clients 45 submit information to system 10 and the content management repository 25 directly. The content management repository 25 comprises a repository server 55 and a repository storage 60.

The application server 40 and the other clients 45 can access the business rule processing server 15 and the content management repository 25 through a network 50. The business rule processing server 15 accesses the content management repository 25 and the client layer 20 through network 50.

The application server 40, the other clients 45, the business rule processing server 15, and the repository server 55 each comprise software that allows a secure interface over network 50. The business rule server 15 and the repository server 55 are each connected to network 50 via a communications link 65, 70 respectively. The communications link 65, 70 comprises links such as a telephone, cable, or satellite link. The application server 40 and the other clients 45 can be connected to network 50 via communications links such as a telephone, cable, or satellite link. The application server 40 and the other clients 45 are connected to network 50 via a communications link 75, 80, respectively.

While system 10 is described in terms of network 50, the application server 40, the other clients 45, the business rule processing server 15, and the repository server 55 may also communicate via a local area network, a wide area network, or any other network that allows communication between the application server 40, the other clients 45, the business rule processing server 15, and the repository server 55. Furthermore, any one or more of the application server 40, the other clients 45, the business rule processing server 15, and the repository server 55 may be co-located, communicating over a network such as, for example, a local area network while others of the application server 40, the other clients 45, the business rule processing server 15, and the repository server 55 are located remotely, connecting over a network such as, for example, the Internet.

Figure 2:
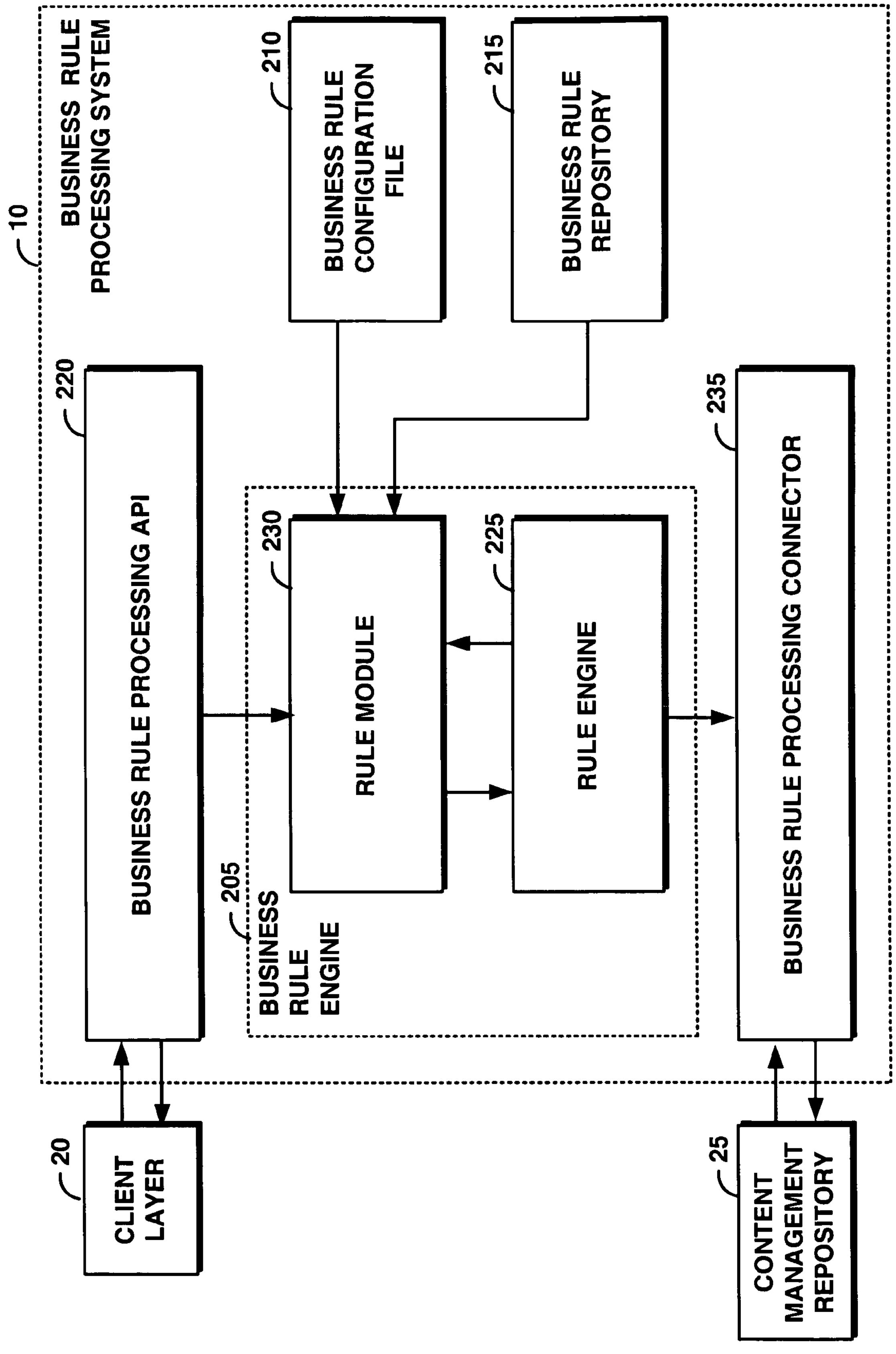
FIG. 2 is a block diagram of the high-level architecture of the business rule processing system of FIG. 1.

FIG. 2 illustrates a high-level architecture of system 10. System 10 comprises a business rule engine 205, a business rule configuration file 210, a business rule repository 215, and a business rule processing application programming interface (API) 220. The business rule engine 205 comprises a rule engine 225 and a rule module 230. The rule engine 225 can be any type of rule engine. The rule engine needs to support an IF (condition) an a THEN (action) kind of rules. It should also be able to call functions in external libraries as part of the action to enable it to interface with the content management API and call functions, for taking actions on the content management repository.

Client interfaces supported by system 10 comprise web clients such as the XFORM client 35 and the HTML form client 30, and the other clients 45 that communicate directly with the business rule engine 205 by calling the business rule processing API 220. Web clients comprise a Web browser that supports, for example, HTML, XHTML, XForm, etc. Users input data into the Web browser, which performs a mapping between the input data and a data model schema in the content management repository 25.

The Web client submits the data and the mapping information to the application server 40. The application server 40 performs processing and invokes system 10, passing the data via the API methods of the business rule processing API 220. Response from system 10 is returned and rendered at the Web clients. Direct communication from the other clients 45 to the business rule processing server 15 is set up locally or over the network 50 through network file systems, RMI, or Web services.

The business rule processing API 220 accepts data and events from the client layer 20 and feeds processing results back to the client layer 20. The business rule repository 215 stores business rule definition files. The business rule configuration file 210 functions as a business rule querying mechanism. A business rule processing connector 235 comprises a library; the business rule processing connector 235 is a connector between the business rule engine 205 and the content management repository 25, providing content-management-related operations for temporary in-memory objects and persistent in-repository objects stored in the content management repository 25.

The business rule engine 205 performs actions comprising querying the business rule repository 215 to find matching business rules, parsing and executing business rules with related actions, communicating with the content management repository 25 to carry out create, retrieve, update, and delete (CRUD) operations, and reporting business rule processing results to client applications in the client layer 20.

The business rule processing connector 235 assumes the responsibilities of communicating between the content management repository 25 and the business rule engine 205. The business rule processing connector 235 is a library class that comprises various methods to perform create, retrieve, update, and delete operations on item instances that are stored in-memory or in-repository in the content management repository 25.

The rule module 230 utilizes one or more business rule definitions file stored in the business rule repository 215. The business rule definition file is also referenced as a business ruleset because the business rule definition file comprises many business rule blocks. Each business rule block itself comprises many small pieces of business rule definitions. The business rule definition file comprises text format and XML format. An exemplary structure of business rule definition file in text format is as follows:

```
business ruleset <nameOfbusiness ruleset> {
   <import package.class;>*                    // zero or more statements
   <library package.class;>*                   // zero or more statements
   predicates {<predName>*};                                        // optional
   variables {<variable declaration;>+}// optional block, one or more
variables
   Inputs {<variableName>*};          // optional, zero or more variables
   outputs {<variableName>*};         // optional, zero or more variables
   functions {<name/arity>*}*;               // optional, zero or more pairs
   void init( ) {<rule>+};            // optional, invoked by bean init( )
   void preProcess( ) {<rule>+};    // optional, invoked before process( )
   void process( ) using <engineType>{ <rule>+}    //required rule block
   void postProcess( ) {<rule>+}      // optional, invoked after process( )
   void processTimerEvent( ) {<rule>+} // optional, invoked on timer pop
   void processAbleEvent( ) {<rule>+} // optional, invoked by AbleEvent
   void catch( ) {<rule>+}            // optional rule block for exceptions
   void quitAll( ) {<rule>+}         // optional, invoked by bean quitAll( )
}
```

Examples of business rule blocks comprise init( ), preprocess( ), process( ), postprocess( ), processTimerEvent( ), processAbleEvent( ), quitall( ), and catch( ). At runtime, an instance of a business ruleset bean is created as in-memory representation of the business ruleset definition file. Business rule blocks can be invoked by calling corresponding methods on the instance of the business ruleset bean. Process( ) is a block in which users define the core business rules that express the main purpose of the business ruleset definition file. Other blocks manage initialization, preprocessing and post processing, timer-based business rules, event-based business rules, exit and exception handling, etc. Each business ruleset accepts an array of input variables and produces another array of output variables. For extensibility reasons, the business ruleset can import classes and methods, for example, from external Java packages. Users can also define inner classes and functions inside the business ruleset definition.

The rule engine 225 comprises an inference engine that executes rules in a certain order according to the inference engine. There are many types of inference engines that can be used by the rule engine 225: script, forward chaining, backward chaining, fuzzy, pattern matching, etc. The script inference engine, for example, sequentially executes selected business rules defined in a business rule block.

Applications of the content management system 100 typically have different item types defined corresponding to the different entity types with which the application deals. For example, an auto insurance company may have item types like Insurance Policy, Claim, Police Report, Accident Photo, and a Claim Case Folder. An exemplary business rule definition file used by the rule engine 225 is as follows:

```
business ruleset claim_insert_entry {
   import com.ibm.mm.beans.CMBItem;
   import java.text.SimpleDateFormat;
   import java.util.Date;
   variables {
      String claimNumber;
      String error="<<Error(s):>>";
      String pass="<<Passed all rules>>";
      String explanation;
      Categorical result=new Categorical(
         new String[ ][ ]{"Approved", "Rejected"});
      Date now=new Date( );
      Date accidentDate;
   }
   Inputs {claimIn};                                  // input item to check
   outputs {result, explanation};                  // result and reason why
```

-continued

```
   void preProcess( ) {
      claimNumber=claimIn.getClaimNumber( );
      accidentDate=claimIn.getAccidentDate( );
   };
   void process( ) using Script{
      Null_ClaimNumber:            // make sure claim number is not null
         If (claimNumber.equalsIgnoreCase(" ")){
            error=error+" ::Empty ClaimNumber";
            reject=true;
         }
      OutOfBound_AccidentDate:          // make sure valid accident date
         If (accidentDate.after(now)){
         error=error+" ::Invalid AccidentDate, should be earlier than
current date";
            reject=true;
         }
         Result:
         If(!reject){
            result="Approved"; explanation=pass;
         }else{
            Result="Rejected"; explanation=error;
         }
   }   // end of process( ) block
}      // end of rule definition file
```

This exemplary business rule definition file checks attributes for null values and boundary values for the input insurance Claim item and provides result and explanation for the business rule processing.

The business rule definition files are stored and managed in the business rule repository 215. In one embodiment, a file system provides physical storage for the business rule repository 215. The business rule engine 205 employs the business rule configuration file 210 to determine which business rules are associated with an input data type and where to find the business rule definition files. The business rulesets are further classified according to action types and business ruleset types so that an appropriate subset of business rulesets is applied to each input datatype. Classification of business rulesets improves scalability when the number of business rules is large.

An exemplary business rule configuration file is as follows:

```
<?xml version="1.0" encoding="UTF-8"?>
<RSMapping xmlns:xsi="http://www.w3.org/2001/XMLSchema-instance"
xsi:noNamespaceSchemaLocation="C:\project\BusinessRuleEngine\
src\RSConfig.xsd">
      <ItemType ITName="Claim" StopOnFirstViolation="false">
            <business ruleset>
         <ActionType>INSERT</ActionType>
         <RSType>ENTRY</RSType>
         <RSName>claim_insert_entry</RSName>
         <RSFileType>ARL</RSFileType>
   <RSFileLocation>C:/eclipse3.0/workspace/BusinessRuleEngine/src/
claim_insert_entry.arl</RSFileLocation>
   </business ruleset>
   <business ruleset>
         <ActionType>INSERT</ActionType>
         <RSType>ACTION</RSType>
         <RSName>claim_insert_action</RSName>
         <RSFileType>ARL</RSFileType>
   <RSFileLocation>C:/eclipse3.0/workspace/BusinessRuleEngine/src/
claim_insert_action.arl</RSFileLocation>
   </business ruleset>
   <business ruleset>
         <ActionType>INSERT</ActionType>
         <RSType>POST</RSType>
         <RSName>claim_insert_post</RSName>
         <RSFileType>ARL</RSFileType>
   <RSFileLocation>C:/eclipse3.0/workspace/BusinessRuleEngine/src/
claim_insert_post.arl</RSFileLocation>
   </business ruleset>
```

-continued

</ItemType>
...
</RSMapping>

The exemplary business rule configuration file 210 shows business ruleset information for a claim item in an insurance application. The exemplary business rule configuration file defines available business ruleset definitions (business ruleset elements) for each item type (ItemType element). The ItemType element has the following attributes: ITName is a string for the ItemType name, StopOnFirstViolation is a Boolean to indicate whether the business rule engine 205 stops processing a business ruleset when it encounters the initial violation. In each business ruleset, system 10 can have one or more related business rule definitions and one item instance can violate one or more of the related business rule definitions. If StopOnFirstViolation is false, the business rule engine 205 does not stop processing at the initial business rule violation.

Figure 3:
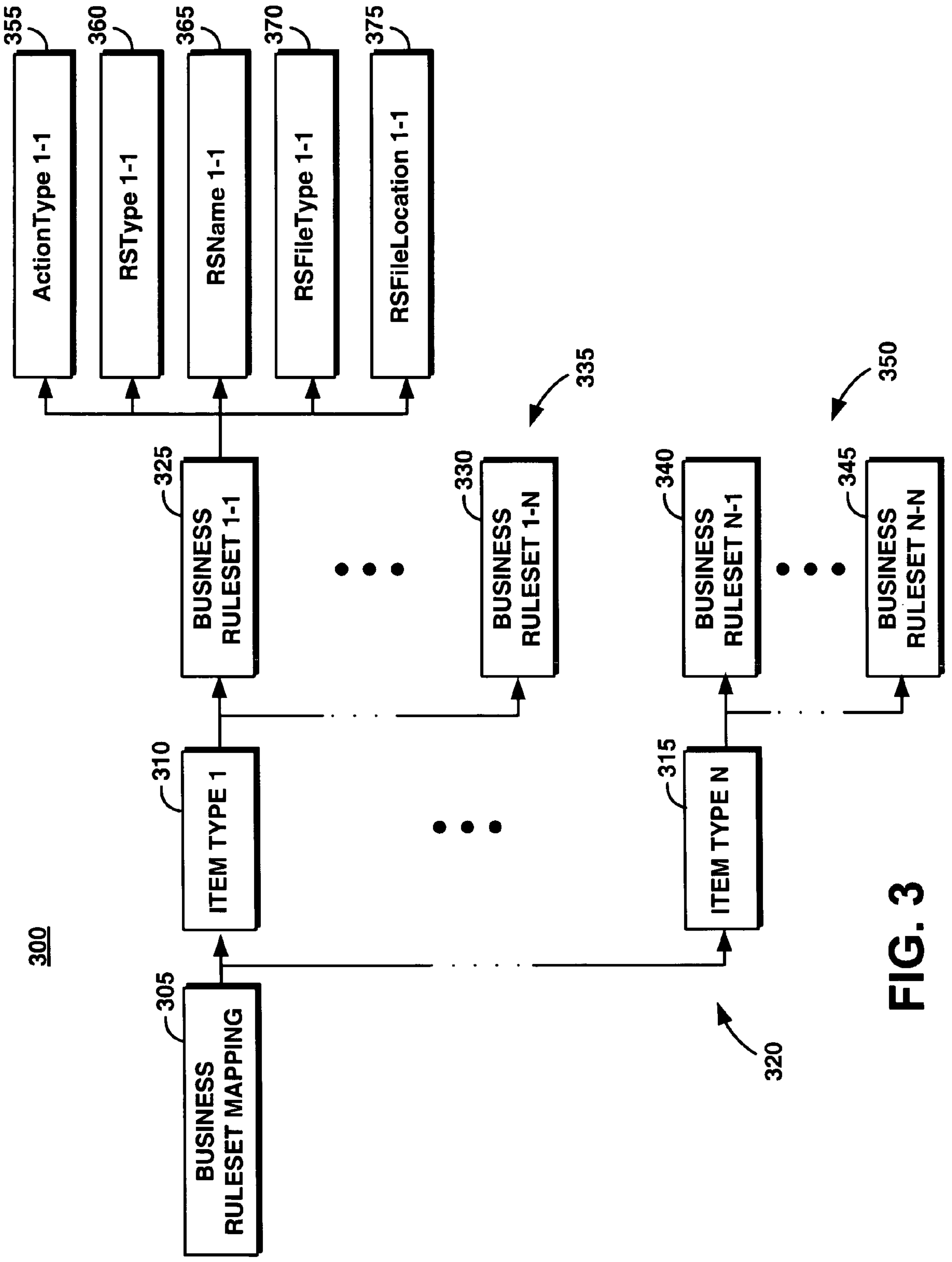
FIG. 3 is a diagram of a schema view of a business rule configuration file in the business rule processing system of FIGS. 1 and 2.

In one embodiment, the business rule configuration file 210 comprises XML, as illustrated by the schema view of FIG. 3. The business rule configuration file 210 comprises a business ruleset mapping 305. The business ruleset mapping 305 provides a mapping between a business ruleset and a data type. The business ruleset mapping 305 comprises one or more item types such as item type 1, 310, through item type N, 315, collectively referenced as item types 320. In general, the item types 320 correspond to a table or a relation and comprise a hierarchical tree structure.

Each of the item types 320 comprises zero or more business ruleset elements. For example, item type 1, 320, comprises business ruleset 1-1, 325, through business ruleset 1-N, 330 (collectively referenced as business ruleset 1, 335). Item type N, 315, comprises business ruleset N-1, 340, through business ruleset N-N, 345 (collectively referenced as business ruleset N, 350). Each of the business ruleset elements (i.e., business ruleset 1, 335 through business ruleset N, 350) comprises the following child elements: ActionType, RSType, RSName, RSFileType, and RSFileLocation. In FIG. 3, child elements are shown for business rule set 1-1, 325: ActionType 1-1, 355; RSType 1-1, 360; RSName 1-1, 365; RSFileType 1-1, 370; and RSFileLocation 1-1, 375.

In general, ActionType captures information about what action triggers the business rule. Client applications may need to invoke the business rule engine 205 at different times while performing different actions on data items. System 10 comprises the following action types: INSERT for creating a new item instance in the content management repository 25; UPDATE for changing content of an existing item instance in the content management repository 25; and DELETE for removing an existing item instance from the content management repository 25. Action types can comprise other actions such as moving an item from one stage to the next in a workflow, etc. RSName assigns a string to each business ruleset bean as a name. RSFileType selects the format type of the ruleset file such as, for example, text or XML. RSFileLocation comprises a string for a path in the file system where the business rule definition file can be located.

RSType contains a string that specifies the business ruleset type. Typically for any action, system 10 executes one or more business rules either before taking an action, during an action or after an action. System 10 classifies business rulesets into different types according to the data processing stages: ENTRY stage, ACTION stage, and POST stage.

When input data initially enters the business rule engine 205, ENTRY business rulesets are applied to the input data. ENTRY business rulesets can be used to validate a data item before taking an action. In an auto-fill feature, ENTRY business rulesets can be used to automatically set some attributes of the data item based on predetermined conditions. ENTRY business rulesets can perform queries on the content management repository 20 to obtain attribute values based on predefined primary-foreign key relationships on the data model of the content management system 100. The query results are used to automatically replace invalid attribute values and fill missing attribute values.

For example, the business rule set mapping 305 comprises a policy item type (insurance policy) and claim item type (claim filed for an accident). The policy item type and claim item type comprise a PolicyNumber attribute and a NamedInsured attribute. The PolicyNumber attribute can be used as a primary key on the policy item type and a foreign key on the claim item type. If an instance of the policy item type in the content management repository 25 comprises a PolicyNumber that matches the PolicyNumber of the incoming instance of the claim item type, system 10 knows that the instance of the claim item type is valid because the claimed PolicyNumber exists. Further, system 10 can automatically assign the NamedInsured value on the instance of the Policy item type to the NamedInsured attribute on the instance of the claim item type.

The auto-fill feature can avoid invalid input data and reduce input effort. After validation and auto-fill, the remaining ENTRY business rulesets are executed on the input data to test constraints on value boundary, relationship cardinality, and other user-specified conditions. For example, system 10 can comprise a business ruleset that checks whether the age of a person falls between 18 and 24 (young driver) or between 50 and 70 (senior driver) as a group for special insurance rates.

In one embodiment, validation functionality such as validation performed by ENTRY business rulesets is implemented in the client applications, i.e., validation using JavaScript in a Web browser.

After the ENTRY business rulesets are evaluated, system 10 executes ACTION business rulesets. ACTION business rulesets perform operations on the input data such as, for example, insert a new item instance into the content management repository 25, or update existing item instances in the content management repository 25.

After the state of the content management repository 25 is modified by the ACTION business rulesets, system 10 triggers other possible actions based on the modified state of the content management repository 25. These business rulesets are categorized as POST business rulesets and this business rule processing stage is the POST stage. For example, an exemplary POST business ruleset is defined as "when all the auto insurance application documents are ready and verified, create a new folder (a special item type in the content management repository 25), and notify manager Jack for endorsement". This POST business ruleset generates a new folder in the content management repository 25, places the application documents in the generated folder, and routes the generated folder to a workflow system for approval by the manager.

POST business rulesets provide a mechanism to initiate further steps after an action has been taken to update the state of the content management repository 25. POST business rulesets can be used to initiate and execute a business process and to support event-based actions and notifications. A POST action may trigger cascading calls into the business rule engine 205 since the generation of another item can require execution of the ENTRY, ACTION, and POST business rules for that generated item.

System 10 exposes the following public API methods for an application in the client layer 20 to use: a validate method (validate 0) and a commit method (commit ( )). The validate method requests the business rule engine 205 to execute the ENTRY business rulesets on the input data in-memory. The commit method requests the business rule engine 205 to process the applicable business rulesets in, for example, the following order: ENTRY business rulesets, ACTION business rulesets, and POST business rulesets. Consequently, the validate method allows applications in the client layer 20 to initiate pre-submit validation ensuring that input data are valid. The validate method further automatically fills certain missing data through queries to the content management repository 25. When the applications in the client layer 20 are ready to submit the data to the content management repository 25, the commit method is called. The business rules associated with the input data type are executed to change the state of the content management repository 25 and trigger future operations based on the modified state of the content management repository 25.

Figure 4A:
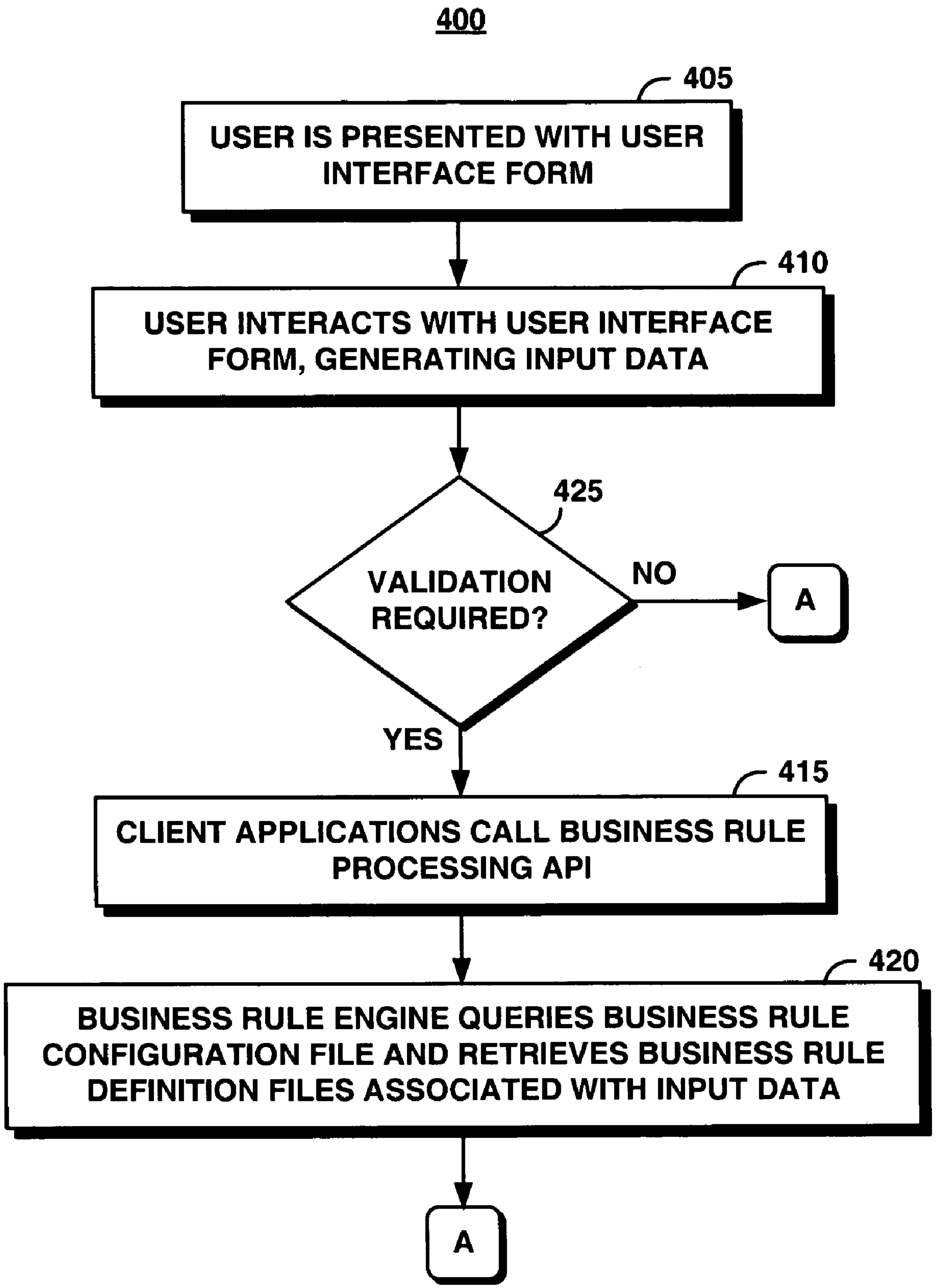
FIG. 4 is comprised of FIGS. 4A, 4B, and 4C, and represents a process flow chart illustrating a method of operation of the business rule processing system of FIGS. 1 and 2 in executing actions associated with data entry.
Figure 4B:
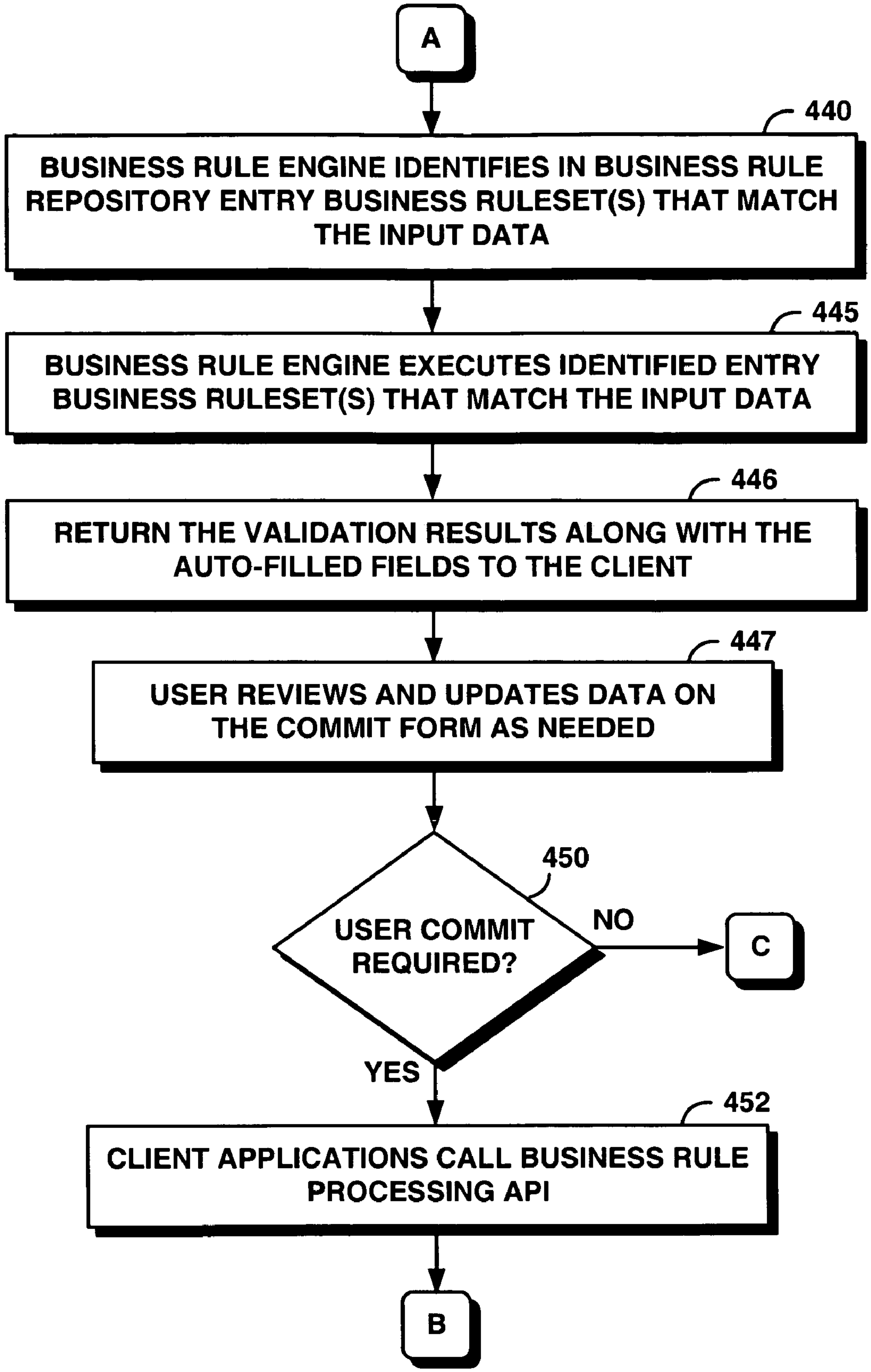
Figure 4C:
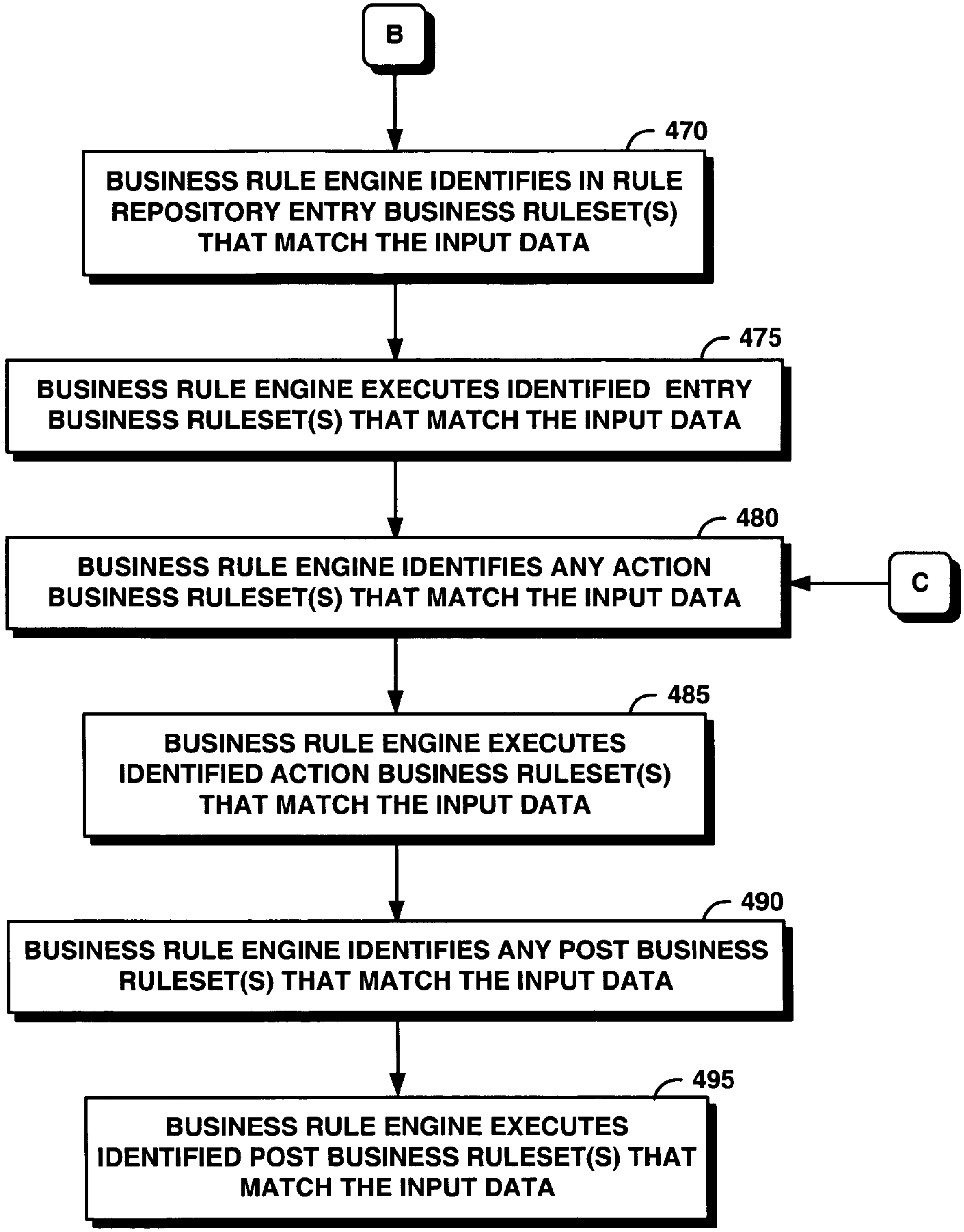

FIG. 4 (FIGS. 4A, 4B, 4C) illustrates a method 400 of system 10 in performing a typical business rule execution. A user is presented with a user interface form (step 405). The user may be operating a web client such as the XFORM client 35 or the HTML client 30. Otherwise the user may be accessing system 10 on the business rule processing server 15 directly as, for example, the other clients 45. The user interacts with the user interface form, generating input data (step 410). Based on the user interaction, the client determines whether validation is required (decision step 425). If validation is required, the client applications of the user provide input data with or without the application server 40 to system 10 by calling the validate( ) method of the business rule processing API 220 (step 415).

Based on the input data, event types, and attributes, the business rule engine 205 queries the business rule configuration file and retrieves business rule definition files associated with the data from the business rule repository 215 (step 420).

If at decision step 425 it is determined that validation is not required, the business rule engine 205 identifies the business rule repository 215 ENTRY business ruleset(s) that match the input data (step 440). The ENTRY business rulesets contain the validation rules for the input data as well as rules for auto-filling certain fields of the data.

The business rule engine 205 performs the identified ENTRY business ruleset(s) that match the input data (step 445). The business rule engine 205 then returns the validation results, along with the auto-filled fields to the client (step 446). The client presents this information to the user through the user interface. The user reviews and updates as needed data on the commit form (step 447).

Based on the user interaction, the client determines whether a user commit is required for the input data (decision step 450). If a user commit is required, the client applications of the user provide input data with or without the application server 40 to system 10 by calling the commit( ) method of the business rule processing API 220 (step 452). The business rule engine 205 identifies in the business rule repository 215 ENTRY business ruleset(s) that match the input data (step 470). The business rule engine 205 performs the identified ENTRY business ruleset(s) that match the input data (step 475).

After applying the ENTRY rules, the business rule engine 205 identifies in the business rule repository 215 ACTION business ruleset(s) that match the input data (step 480). The business rule engine 205 performs the identified ACTION business ruleset(s) that match the input data (step 485). The business rule engine 205 identifies in the business rule repository 215 POST business ruleset(s) that match the input data (step 490). The business rule engine 205 performs the identified POST business ruleset(s) that match the input data (step 495).

During the business rule execution process, the business rule engine 205 communicates with the content management repository 25 to perform create, retrieve, update, and delete operations. The data model for client applications in the client layer 20 is pre-defined in the content management repository 25 and the business rule engine 205 knows the mapping between input data and the data model. Consequently, the business rule engine 205 can recognize input data types and applications can be notified of results in the desired format. The results further trigger other type of actions if the business rule engine is integrated with applications such as, for example, process management or workflow systems.

Figure 5:
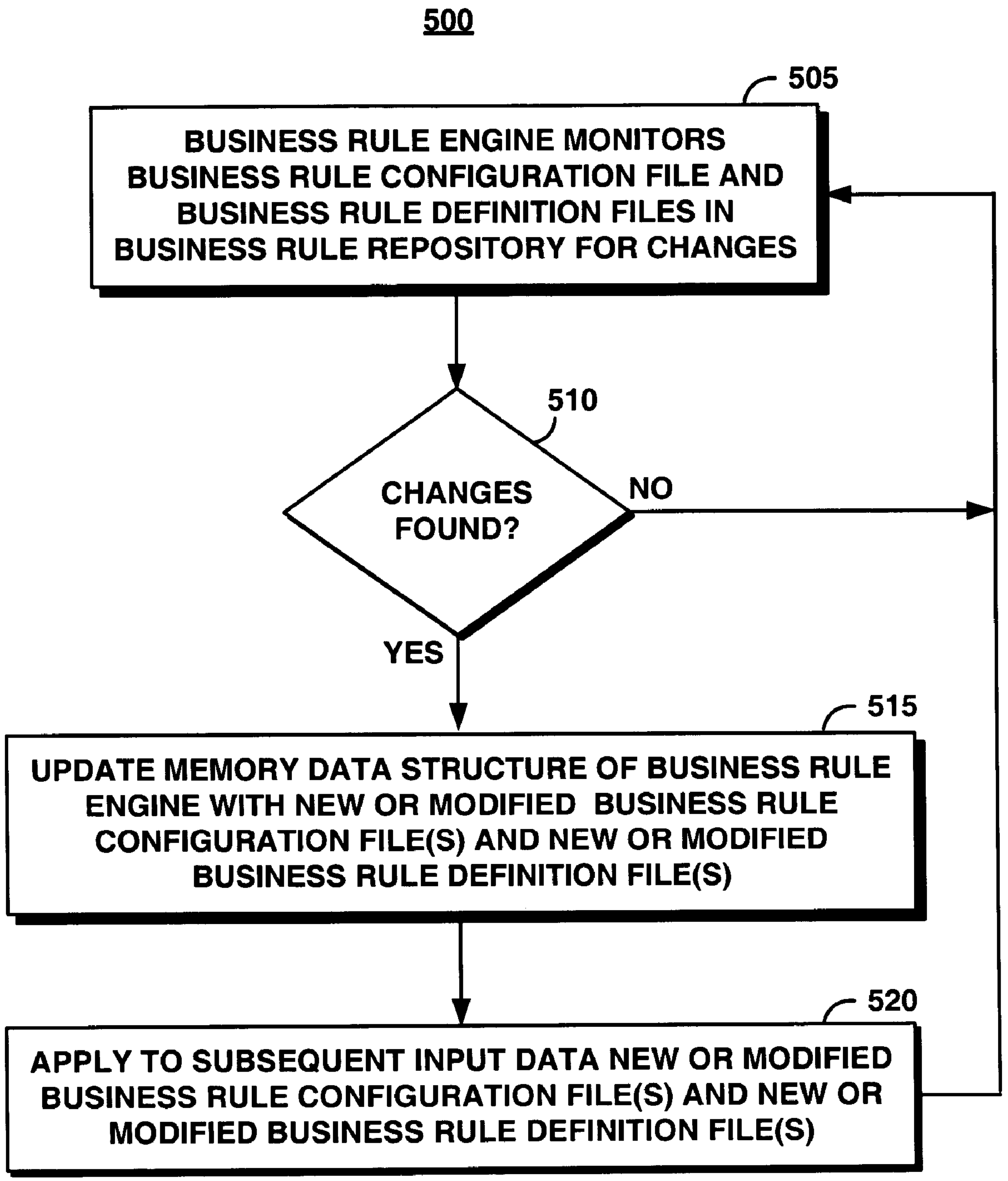
FIG. 5 is a process flow chart illustrating a method of operation of the business rule processing system of FIGS. 1 and 2 in dynamically changing business rules in response to user modifications.

As illustrated in FIG. 5 by a method 500 of system 10, system 10 enables dynamic scenarios in which business rules may change over time due to changes in the business requirements, company policies, government regulations, etc. The business rule engine 205 monitors the business rule configuration file 210 and the business rule definition files in the business rule repository 215 for changes (step 505). If changes are not found (decision step 510), the business rule engine 205 continues monitoring in step 505.

When changes are found (decision step 510), the business rule engine 205 updates the memory data structure of the business rule engine 205 with new or updated business rule configuration file(s) 210 and the new or updated business rule definition file(s) (step 515). The new or updated business rule definition file(s) and the new or updated business rule configuration files(s) 210 are effective on the next invocation of the business rule engine 205. The business rule engine 205 applies to subsequent input data the new or updated business rule configuration file(s) 210 and the new or updated business rule definition file(s) (step 520). Consequently, the business rulesets can be dynamically updated without having to explicitly shut down the server applications. The business rule engine 205 returns to step 505 and continues to monitor the business rule configuration file 210 and the business rule definition files.

An exemplary application of system 10 comprises auto insurance management. Definitions of the insurance management data model comprise the following item types: Auto Policy, Police Report, Auto Claim, Damage Photo, and Claim Folder. The Auto Policy item type is presented in Table 1. The Police Report item type is presented in Table 2. The Auto Claim item type is presented in Table 3. The Damage Photo item type is presented in Table 4. The Claim Folder item type is presented in Table 5.

TABLE 1

Auto Policy Item Type.

| | | |
|---|---|---|
| Policy Number | Alphanumeric, length = 10 | |
| NamedInsured | Varchar, length < 128 | |
| NamedInsured Address | Varchar, length < 512 | |
| Agent Name Address | Varchar, <1028 | |
| Start Date | Date | |
| End Date | Date | |
| Insured Vehicle (child comp., 1 . . . 4) | License Number | Alphanumeric, length = 10 |
| | Name | Varchar, length < 128 |
| | Date of Birth | Date |
| | Gender | F or M |

TABLE 1-continued

| Auto Policy Item Type. | | |
|---|---|---|
| Operator (child comp., 1 . . . 2) | Year | Integer, 1900 < length < 2999 |
| | Make | Varchar, length < 32 |
| | Model | Varchar, length < 32 |
| | VIN | Alphanumeric, length = 10 |

TABLE 2

| Police Report Item Type. | |
|---|---|
| Report Number | Alphanumeric, length = 10 |
| Accident Date | Date |
| Accident Location | Varchar, length < 128 |
| Officer Name | Varchar, length < 128 |
| Vehicle VIN | Alphanumeric, length = 10 |

TABLE 3

| Auto Claim Item Type. | |
|---|---|
| NamedInsured | Varchar, length < 128 |
| Claim Number | Alphanumeric, length = 10 |
| Policy Number | Alphanumeric, length = 10 |
| Affected VIN | Alphanumeric, length = 10 |
| Accident Date | Date |
| Accident Location | Varchar, length < 128 |
| Damage Description | Varchar, length < 1024 |

TABLE 4

| Damage Photo Item Type. | |
|---|---|
| Policy Number | Alphanumeric, length = 10 |
| Photo Date | Date |
| Claim Number | Alphanumeric, length = 10 |
| Photo Content | Document Part, DKImageICM |

TABLE 5

| Claim Folder Item Type. | |
|---|---|
| Folder Name | Varchar, length < 128 |
| Folder Description | Varchar, length < 1024 |

Each item type has a set of attributes and may have child components (sub structures) with given cardinality. For example, Table 1 shows the attribute names and value types for Auto Policy item type. It comprises the following child components: Insured Vehicle with cardinality 1 . . . 4 (minimum 1 vehicle and maximum 4 vehicles) and Operator with cardinality 1 . . . 2. Primary key and foreign key relationships are also established for referential integrity checks and query processing between item types. For example, a primary key is defined on Policy Number attribute on Auto Policy item type and a foreign key is defined on Policy Number on Auto Claim item type.

Separate business rule definition files are prepared for each item type, with different action types and business ruleset types (business rule processing stages). For example, a Claim item type can have a business rule definition file for INSERT action, at an ENTRY stage called claim_insert_entry.arl. Using this business rule definition, the business rule engine 205 checks input data on a claim against whether a vehicle in an accident has a record within one policy in the content management repository 25. If not, the business rule engine 205 reports the data input as an invalid claim.

The business rule engine 205 performs null value checks on the attributes with a boundary check on Accident Date to ensure the entered Accident Date is no later than current time. The business rule block is defined to automatically fill the Named Insured attribute using the primary key and foreign key relationship on the Policy Number attribute. In a similar manner, other business rule definitions can be defined.

Figure 6:
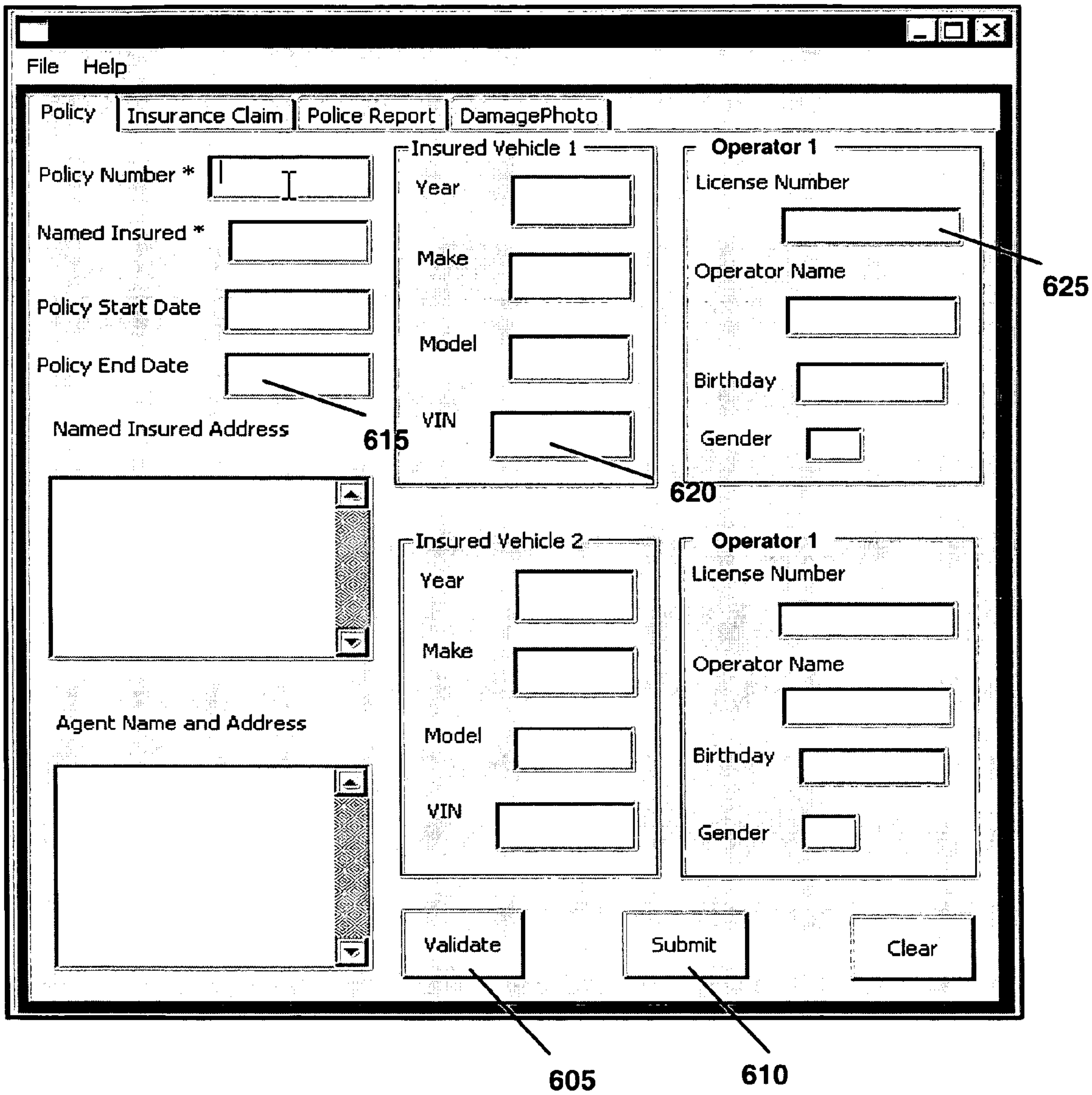
FIG. 6 is an exemplary graphical user interface for data entry in a system using the business rule processing system of FIGS. 1 and 2.

FIG. 6 illustrates an exemplary graphical user interface that allows users to interact with system 10 and the content management repository 25. The client directly calls the validate method and the commit method to exchange data and events with the business rule engine 205 by selecting a validate button 605 and a submit button 610. Users input data into various text fields 615, 620, 625, which internally maps to the predefined content management data model. The validate button 605 calls the validate method to execute business rule checks for the in-memory item instances. These business rule definitions comprise attribute value checks, integrity check based on primary and foreign key relationships, automatic fill of missing attribute values and correction of invalid values. The submit button 610 calls the commit method, which changes the state of the content management repository 205 with the user input data and triggers further actions.

It is to be understood that the specific embodiments of the invention that have been described are merely illustrative of certain applications of the principle of the present invention. Numerous modifications may be made to the system, the computer program product, and the associated method for automatically processing dynamic business rules in a content management system described herein without departing from the spirit and scope of the present invention.

What is claimed is:

1. A computer implemented method of automatically processing dynamic business rules in a content management system, comprising:

authoring first business rules in a first business rule definition file in the content management system, wherein the authoring is processed using a computer with a computer processor;

configuring the first business rules in the first business rule definition file;

setting a predetermined action regarding whether to stop processing the first business rules after a first violation of one of the first business rules:

classifying the first business rules into stages of data processing actions on the first business rules;

creating a first set of the first business rules for testing first input data for validity with respect to numeric and relationship categories;

creating a second set of the first business rules for performing first operations on the first input data;

creating a third set of the first business rules which provide a mechanism that initiates further action after a content management repository is updated;

classifying fourth business rulesets according to different first action types and business ruleset types;

managing the first business rules in the first business rule definition file;

receiving a set of second input data to which the first business rules apply;

determining whether updated data from the user needs to be stored in the content management repository and processed;

mapping the first business rules to the set of second input data to identify the first business rules required by the set of second input data;

executing the identified first business rules against different backend data models;

monitoring the identified first business rules to determine if a new business rule is introduced;

updating the first business rule definition file to reflect the new business rule;

updating the business rule definition file during the processing of at least two of: the first business rules, the first input data, and the second input data;

executing the updated first business rule definition file; and displaying the updated first business file on a display unit, wherein the first business rules are dynamic and are based on the set of second input data stored in the content management repository, to enable querying of the content management repository based on foreign key relationships to auto-fill the fields.

2. The method of claim 1, further comprising defining the first business rules in a second business rule definition file stored in a business rule repository.

3. The method of claim 1, wherein the business ruleset types comprise at least one:

one of the first action types that captures information about which action triggers one of the first business rules that comprises insert, update, and delete actions;

insert type that creates a new item instance in the content management repository;

delete type that removes an existing item instance in the content management repository;

update type that changes a content of an existing item instance in the content management repository;

RSType that specifies one of the business ruleset types;

entry type that performs validation and automatic filling of fields;

action type that modifies a state of the content management repository by performing operations on the set of second input data;

post type that executes actions based on the modified state of the content management repository;

RSName type that assigns a name to one of the fourth business rulesets;

RSFileType type that identifies a file type of the one of the fourth business rulesets; and RSFilelocation type that comprises a string for a path in a file system where the second business rule definition file might be located.

4. The method of claim 1, further comprising defining the first business rules in the first business rule definition file stored in a first business rule configuration file.

5. The method of claim 4, further comprising identifying one of the first business rules that is associated with an input data type; and further determining the location of the first business rule definition file that is associated with the identified one of the first business rules.

6. The method of claim 1, wherein the backend data models have different hierarchical schemas.

7. The method of claim 1, wherein managing the first business rules supports editing, updates, and deletes to a business rule logic.

8. The method of claim 1, wherein the first business rules trigger internal actions.

9. The method of claim 8, wherein the internal actions include initiating a workflow process.

10. The method of claim 1, wherein the first business rules trigger external actions.

11. The method of claim 10, wherein the external actions include notifying the user.

12. The method of claim 10, wherein the external actions include initiating a business process.

13. A computer program product having a plurality of executable instruction codes that are stored on a computer-readable medium, for automatically processing dynamic first business rules in a content management system, comprising:

a computer readable storage medium having computer readable program code embodied therewith, the computer readable program code comprising:

computer readable program code configured to author the first business rules in a first business rule definition file;

computer readable program code configured to configure the first business rules in the first business rule definition file;

computer readable program code configured to create a first set of the first business rules for testing first user input values for validity with respect to numeric and relationship categories;

computer readable program code configured to create a second set of the first business rules that perform first operations on the first user input values;

computer readable program code configured to create a third set of the first business rules which provide a mechanism that initiates further action after a content management repository is updated;

computer readable program code configured to manage the first business rules in the first business rule definition file;

computer readable program code configured to prepare a separate business rule definition file for a separate item type;

computer readable program code configured to receive second user input values to which the first business rules apply;

computer readable program code configured to map the first business rules to the second user input values to identify first business rules required by the second user input values;

computer readable program code configured to perform the identified first business rules against different backend data models;

computer readable program code configured to select an inference engine type;

computer readable program code configured to use the selected inference engine type in an inference engine for executing the first business rules in a specified order;

computer readable program code configured to monitor the first business rules to determine if a new business rule is introduced;

computer readable program code configured to update the first business rule definition file to reflect the new business rule; and computer readable program code configured to perform the updated first business rule definition file.

14. The computer program product of claim 13, further comprising computer readable program code configured to define the first business rules in a second business rule definition file stored in the content management repository.

15. The computer program product of claim 14, further comprising computer readable program code configured to classify fourth business rulesets according to different action types and business ruleset types.

16. A system for automatically processing dynamic first business rules in a content management system, comprising:

a computer with a computer processor for processing dynamic first business rules;

a business rule processing interface for authoring first business rules, and for receiving a set of first input data to which the first business rules apply;

a business rule engine for configuring and managing the first business rules, and for mapping the first business rules to the first input data to identify the first business rules required by the first input data;

the business rule engine further for creating a first set of the first business rules for testing the first input data for validity with respect to numeric and relationship categories;

the business rule engine further for creating a second set of the first business rules for performing first operations on the first input data;

the business rule engine further for creating a third set of the first business rules for initiating further action after an action has been taken to update a content management repository;

the business rule engine further for checking integrity of the content management system based on a plurality of primary key and foreign key relationships;

an inference engine using pattern matching for executing the first business rules in a specified order;

a business rule processing connector for executing the identified first business rules against different backend data models, and for monitoring the first business rules to determine if a new business rule is introduced; and an outputting engine for outputting a reason for each of a plurality of results after applying one of the first business rules to the first input data, wherein the business rule engine performs file updates to reflect the new business rule, and executes the updated files.

17. The system of claim 16, wherein the business rule engine comprises a rule module and a rule engine.

18. The system of claim 17, wherein the rule engine defines the first business rules in a second business rule definition file that is stored in the content management repository.

* * * * *